(12) United States Patent
Ruse et al.

(10) Patent No.: US 7,261,428 B1
(45) Date of Patent: Aug. 28, 2007

(54) POWEREXTEND MIRROR WITH MANUAL OVERRIDE CLUTCH ASSEMBLY

(75) Inventors: James A. Ruse, Allegan, MI (US); Keith D. Foote, Kentwood, MI (US); Kenneth C. Peterson, Comstock Park, MI (US)

(73) Assignee: Magna Donnelly Mirrors North America, L.L.C., Kentwood, MI (US)

( * ) Notice: Subject to any disclaimer, the term of this patent is extended or adjusted under 35 U.S.C. 154(b) by 0 days.

(21) Appl. No.: 11/382,582

(22) Filed: May 10, 2006

Related U.S. Application Data

(60) Provisional application No. 60/594,831, filed on May 10, 2005.

(51) Int. Cl.
*B60R 1/074* (2006.01)
*B60R 1/076* (2006.01)
(52) U.S. Cl. ........................ 359/841; 359/877
(58) Field of Classification Search .............. 359/841, 359/877, 881
See application file for complete search history.

(56) References Cited

U.S. PATENT DOCUMENTS

| | | | |
|---|---|---|---|
| 5,483,385 A | 1/1996 | Boddy | |
| 5,903,402 A | 5/1999 | Hoek | |
| 5,969,890 A | 10/1999 | Whitehead | |
| 6,113,241 A | 9/2000 | Hoek | |
| 6,116,743 A | 9/2000 | Hoek | |
| 6,139,159 A | 10/2000 | Whitehead | |
| 6,213,609 B1 | 4/2001 | Foote et al. | |
| 6,239,928 B1 | 5/2001 | Whitehead et al. | |
| 6,276,808 B1 | 8/2001 | Foote et al. | |
| 6,325,518 B1 | 12/2001 | Whitehead et al. | |
| 6,390,635 B2 | 5/2002 | Whitehead et al. | |
| 6,394,616 B1 | 5/2002 | Foote et al. | |
| 6,439,730 B1 | 8/2002 | Foote et al. | |
| 6,497,491 B2 | 12/2002 | Boddy et al. | |
| 6,582,087 B2 | 6/2003 | Whitehead et al. | |
| 6,598,983 B1 | 7/2003 | Boddy | |
| 2004/0240092 A1* | 12/2004 | Olijnyk et al. | 359/877 |

* cited by examiner

*Primary Examiner*—Mark A. Robinson
(74) *Attorney, Agent, or Firm*—McGarry Bair PC

(57) ABSTRACT

A vehicular mirror assembly comprises a base, a mirror housing, and an actuator. The mirror housing has a reflective element therein, and is coupled with the base for at least a normal path of movement between a retracted position where the mirror housing is adjacent the base and an extended position where the mirror housing is distal to the base. The actuator is operatively mounted between the base and the mirror housing for selectively moving the mirror housing with respect to the base through the normal path of movement. The actuator comprises a motor having a rotatable motor shaft, a gear assembly coupled with the motor shaft and rotatable with rotation of the motor shaft, and a rotatable drive shaft coupled with the gear assembly and the mirror housing for moving the mirror housing through the normal path of movement with rotation of the drive shaft. The mirror housing can be moved between the extended and retracted positions by rotation of the drive shaft and the gear assembly independent of the rotation of the motor shaft, and torque developed by the gear assembly resulting from the rotation of the motor shaft is comparable to the torque developed by the gear assembly resulting from the rotation of the drive shaft.

8 Claims, 11 Drawing Sheets

POWEREXTEND MIRROR WITH MANUAL OVERRIDE CLUTCH ASSEMBLY

CROSS-REFERENCE TO RELATED APPLICATION

This application claims the benefit of U.S. provisional application Ser. No. 60/594,831, filed May 10, 2005, which is incorporated herein in its entirety.

BACKGROUND OF THE INVENTION

1. Field of the Invention

The invention relates to an external vehicle mirror and, more particularly, to an external vehicle mirror having powered extension between laterally-retracted and laterally-extended positions. In one aspect, the invention relates to a slip clutch for the powered extension function that enables the mirror to be manually extended or retracted without damage to the motor or the transmission.

2. Description of the Related Art

External mirror systems are ubiquitous for contemporary vehicles and have long been used to aid the driver in operating the vehicle, especially in improving the rearward view of the driver. Over time, more and more functionality has been incorporated into the mirror system. For example, it is common to extend the reflective element assembly of the mirror system away from the vehicle, which is useful when towing a trailer. Mirror systems incorporating both a powered fold and powered extension functionality are well-known. Examples of such mirror systems are disclosed in U.S. Pat. Nos. 6,276,808 and 6,213,609, assigned to the assignee of the current application, and are incorporated herein by reference.

In one embodiment of the powered extension function, the reflective element of assembly is extended away from the vehicle by the motor-driven rotation of an elongated drive screw which causes a threaded nut driver to travel longitudinally along the drive screw. The nut driver is connected to a movable frame piece to which is attached the reflective element, which translates relative to the drive screw with the movement of the nut driver. Depending upon the direction of rotation of the drive screw, the reflective element is either extended away from the vehicle or retracted toward the vehicle.

At times it may be desirable to manually translate the reflective element assembly between the extended and retracted positions. For example, after leaving the vehicle, the owner may wish to retract the reflective element assembly without having to reenter and restart the vehicle to do so. Similarly, it may be desirable to accommodate inadvertent forcing of the reflective element assembly into the retracted or extended positions with minimal damage to the motor, transmission, drive shaft, or other mirror system components. A conventional powerextend assembly having a tightly interlocking configuration of components (including the interlocking of motor gears or a drive screw) will generally be unable to accommodate such manual translation without damage to the components, particularly the motor and drive screw.

SUMMARY OF THE INVENTION

A vehicular mirror assembly comprises a base, a mirror housing, and an actuator. The mirror housing has a reflective element therein, and is coupled with the base for at least a normal path of movement between a retracted position where the mirror housing is adjacent the base and an extended position where the mirror housing is distal to the base. The actuator is operatively mounted between the base and the mirror housing for selectively moving the mirror housing with respect to the base through the normal path of movement. The actuator comprises a motor having a rotatable motor shaft, a gear assembly coupled with the motor shaft and rotatable with rotation of the motor shaft, and a rotatable drive shaft coupled with the gear assembly and the mirror housing for moving the mirror housing through the normal path of movement with rotation of the drive shaft. The mirror housing can be moved between the extended and retracted positions by rotation of the drive shaft and the gear assembly independent of the rotation of the motor shaft, and torque developed by the gear assembly resulting from the rotation of the motor shaft is comparable to the torque developed by the gear assembly resulting from the rotation of the drive shaft.

DESCRIPTION OF AN EMBODIMENT OF THE INVENTION

Figure 1:
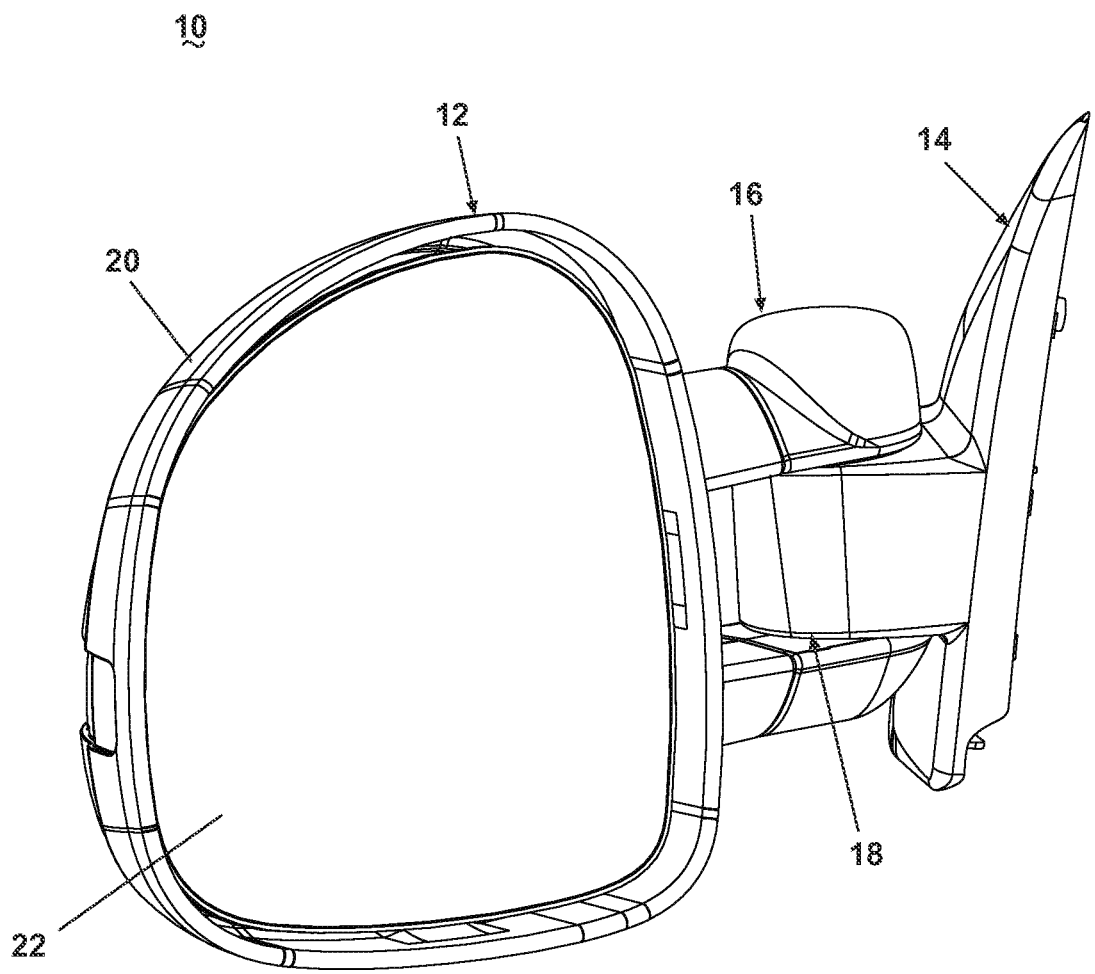
FIG. 1 is a perspective view of an exterior powerextend mirror system according to the invention, comprising a reflective element assembly mounted to a support base adapted to mount to a motor vehicle, with the reflective element assembly shown in a retracted position.

FIG. 1 illustrates a vehicular rearview mirror system 10 having a power extend function according to the invention. The mirror system 10 comprises many elements of a well-known power extendable, pivoting rearview mirror, and such elements will not be described in detail herein except as otherwise necessary to a full understanding of the invention. Additionally, the invention is illustrated and described relative to a generally well-known dual-arm or clevis-type mirror system, although the invention is equally applicable to a single arm mirror system, a non-pivoting mirror system, and other motorized mirror systems.

The mirror system 10 comprises a reflective element assembly 12 and is mounted to a vehicle (not shown) by a suitable base assembly 14. A powered drive assembly (illustrated in FIGS. 5-8) is used to selectively extend the reflective element assembly 12 away from the vehicle, thereby enhancing the rearward view of the driver, and retract the reflective element assembly 12 toward the vehicle when an enhanced rearward view is not needed. The reflective element assembly 12 is connected to the base assembly 14 through a support arm assembly 16 pivotally connected to the base assembly 14 through a pivot assembly 18. The reflective element assembly 12 comprises a housing 20 enclosing a reflective element 22.

Figure 2:
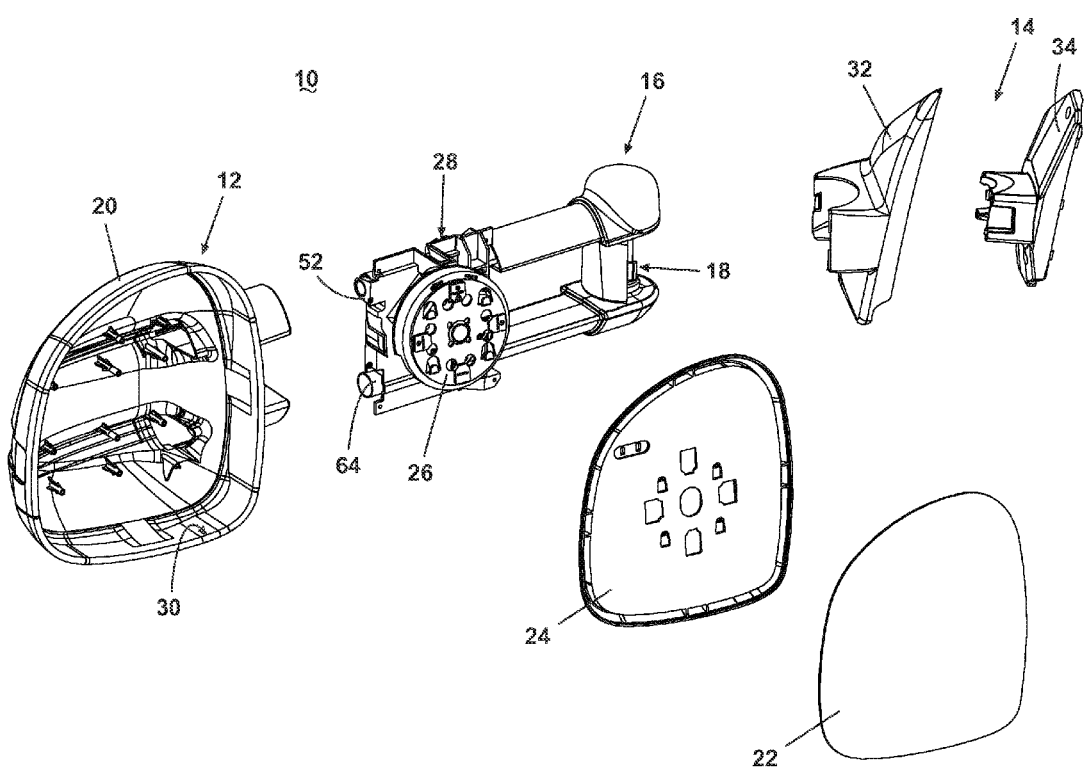
FIG. 2 is an exploded view of the powerextend mirror of FIG. 1, illustrating the support base having a support bracket attachable to a dual support arm assembly supporting a powerextend drive assembly for extending the reflective element assembly relative to the vehicle, and a movable bracket supported by the dual support arm assembly and attachable to the powerextend drive assembly to extend and retract the reflective element assembly.

Referring to FIG. 2, the reflective element 22 is mounted to a glass case 24, which is in turn mounted to a powered tilt actuator 26 for selectively tilting the reflective element 22 about horizontal and vertical axes. The tilt actuator 26 is attached to a movable bracket assembly 28, which is connected to the support arm assembly 16 as hereinafter described. In the reflective element assembly 12, the tilt actuator 26 and the movable bracket assembly 28 are enclosed within the housing 20, which is provided with an opening 30 adapted for registry with the reflective element 22.

Figure 3:
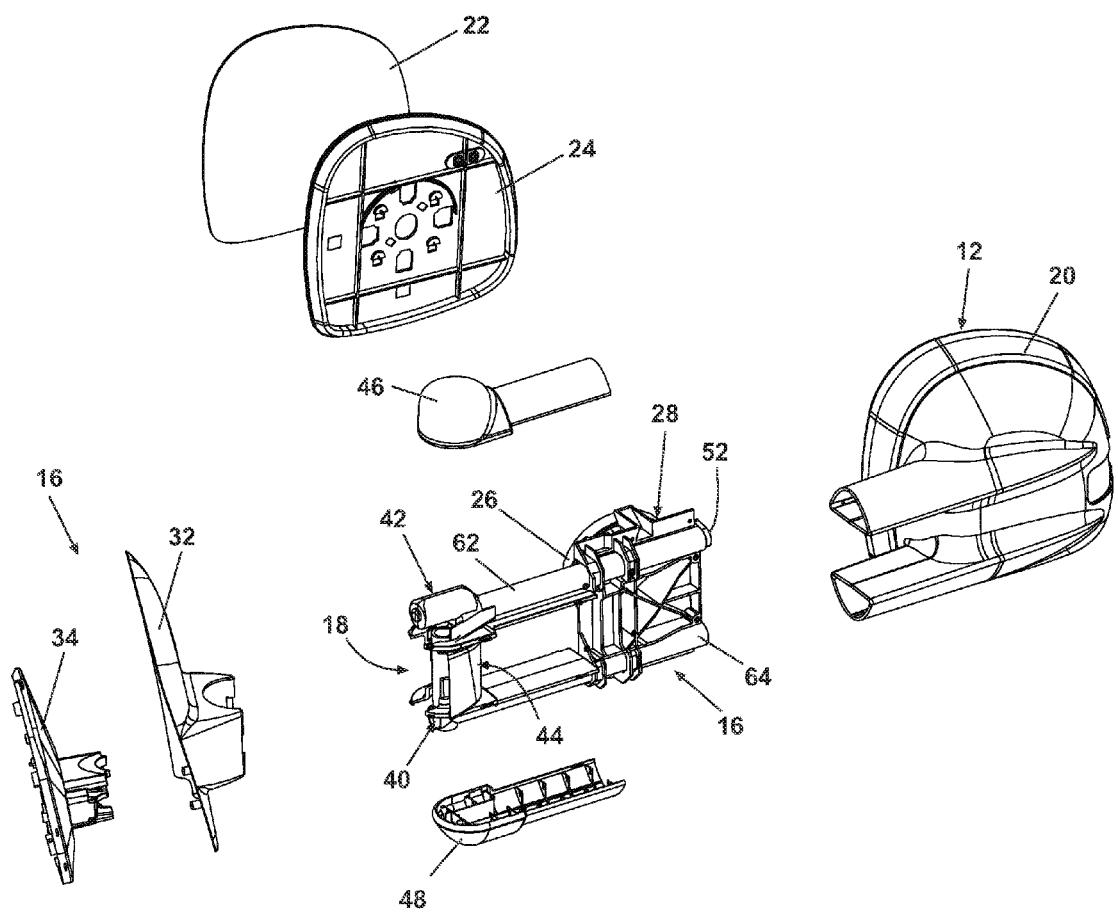
FIG. 3 is an exploded view of the powerextend mirror of FIG. 1, illustrating components thereof.

The base assembly 14 comprises a base housing 32 enclosing a base bracket 34 attachable to a suitable portion of the vehicle, such as the driver-side or passenger-side door panel. Referring also to FIG. 3, additional housing pieces comprise the pivot assembly 18, such as a pivot assembly shell 44, an upper shell 46, and a lower shell 48, all of which enclose the remaining parts of the mirror system 10 to provide a streamlined, unitary appearance to the mirror system 10.

Figure 4:
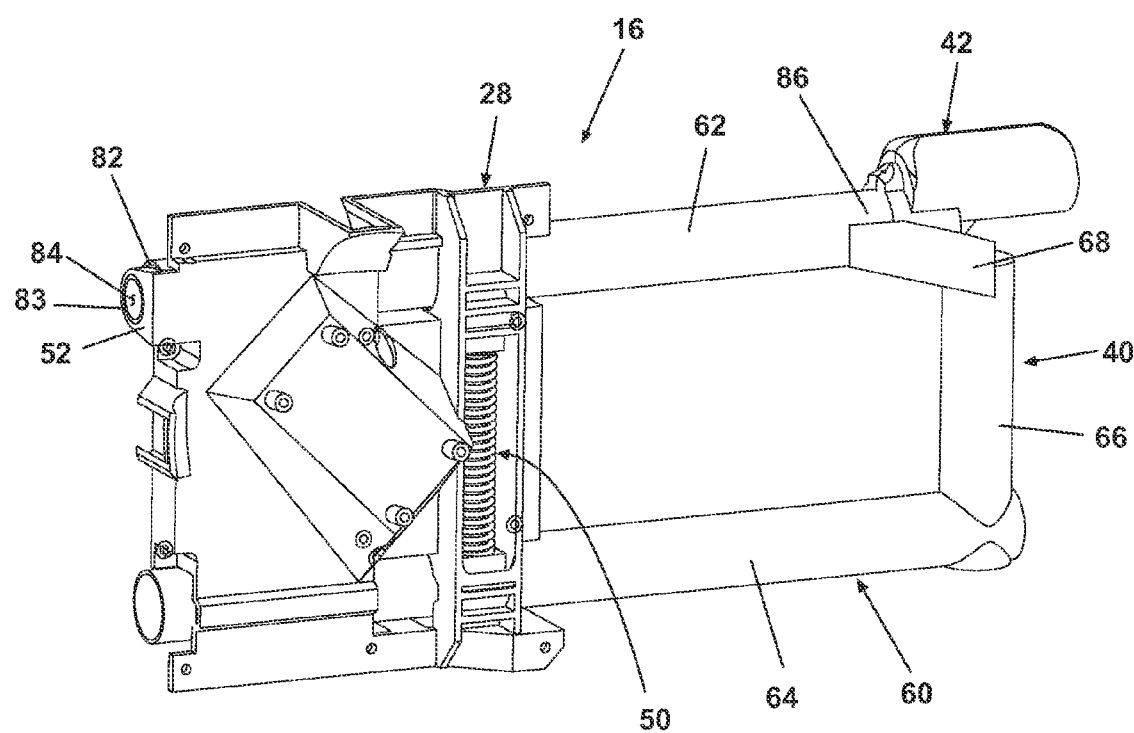
FIG. 4 is an enlarged perspective view of the dual support arm assembly of FIG. 3 supporting the powerextend drive assembly and the movable bracket.
Figure 5:
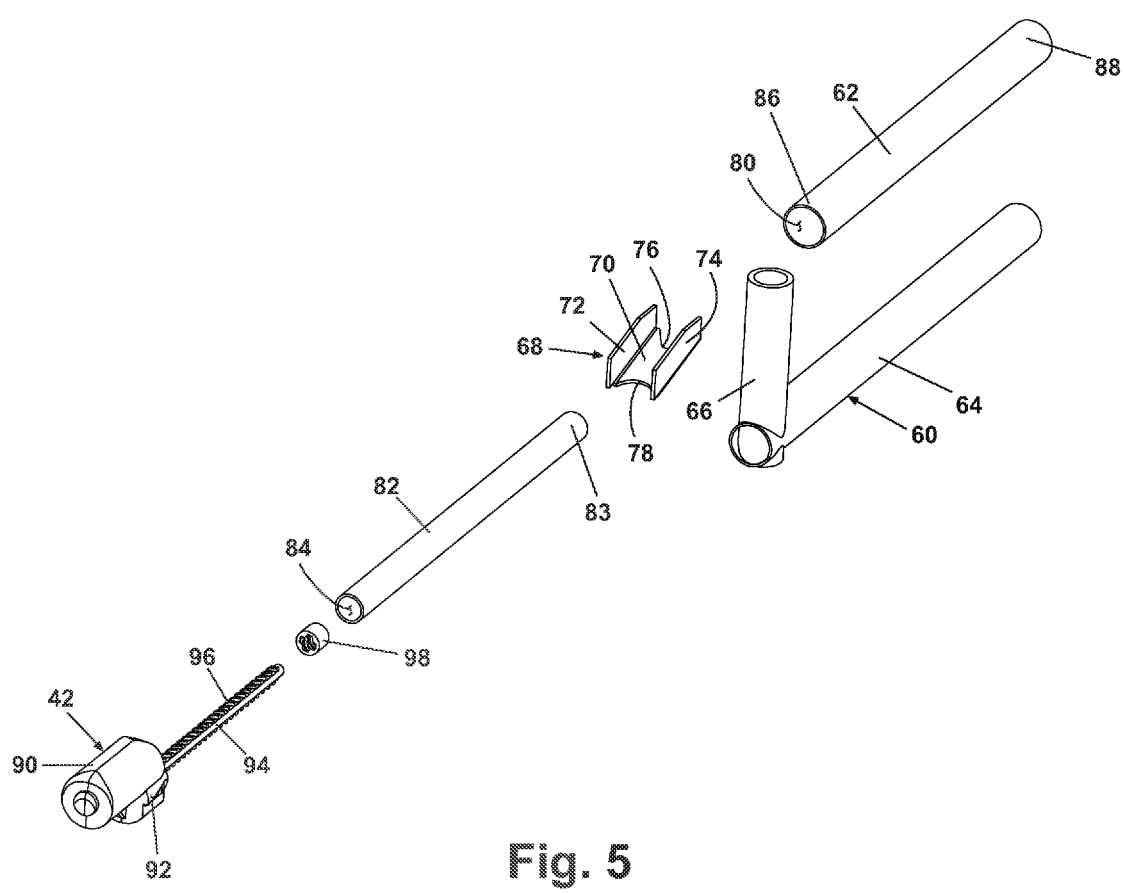
FIG. 5 is an exploded view of a portion of the dual support arm assembly and the powerextend drive assembly of FIG. 4.

The support arm assembly 16 comprises a dual arm assembly 40 adapted to support a motorized powerextend assembly 42. Referring to FIGS. 4 and 5, the dual arm assembly 40 is an elongated framework 60 comprising hollow, elongated members such as round or square tubing. The framework 60 comprises an upper member 62 and a lower member 64 in parallel, spaced-apart juxtaposition. The upper member 62 is illustrated comprising an elongated, cylindrical hollow tube defining a circular bore 80 and having a proximal end 86 and a distal end 88. The lower member 64 is illustrated comprising an elongated, cylindrical hollow tube. The upper member 62 and the lower member 64 are rigidly attached to a pivot member 66, illustrated as comprising an elongated, cylindrical hollow tube, in a generally orthogonal configuration to form a rectilinear, somewhat U-shaped framework 60. The lower member 64 is attached rigidly to the pivot member 66, such as by welding. The upper member 62 is indirectly connected to the pivot member 66 through an inclined support bracket 68 extending between an upper end of the pivot member 66 and the proximal end 86 of the upper member 62 so as not to obstruct the bore 80 with the pivot member 66. Preferably, the tube assembly 60 comprises a light-weight steel or aluminum having sufficient size and strength for the purposes described herein.

A translating member 82 is illustrated comprising an elongated, hollow cylindrical tube defining a circular bore 84 and having a distal end 83 and a cross-section cooperative with the upper bore 80 of the upper member 62 and adapted for slidable registry therein. In a preferred embodiment, the outer diameter of the translating member 82 is somewhat smaller than the diameter of the upper bore 80 to facilitate slidable translation of the translating member 82 in the upper bore 80. A nut follower 98 is adapted for fixed registry with the bore 84, and is selectively retained in the bore 84 in a suitable manner, such as by gluing, brazing, crimping, and the like. As so assembled, the translating member 82 will move with operation of a motor 90 and rotation of a coupled drive shaft 94. With the translating member 82 inserted into the upper bore 80, operation of the motor 90 will translate the translating member 82 through the upper bore 80 beyond the distal end 88.

The support bracket 68 is a somewhat rectilinear, channel-shaped piece comprising a planar bracket bottom wall 70 and a pair of brackets side walls 72, 74 extending orthogonally along two longitudinal edges of the bottom wall 70. A distal end of the bracket bottom wall 70 is provided with a curved distal cutout 76. A proximal end of the bracket bottom wall 70 is provided with a curved proximal cutout 78. The curvature of the cutouts 76, 78 is selected to complement the curvature of the upper and pivot members 62, 66, respectively, to provide complete registry along the edges of the cutouts 76, 78 with the upper and pivot members 62, 66, respectively.

The pivot tube 66 is adapted for pivotal attachment to the base assembly 14 through a generally well-known pivot assembly 18, which can be adapted for either manual or motorized folding and unfolding of the mirror system 10. The tube assembly 60 is adapted for selective folding and unfolding of the mirror system 10 against the vehicle and away from the vehicle through the pivot assembly 18. Examples of a motorized powerfold assembly are shown and described in U.S. Pat. No. 6,439,730 to Foote et al., and U.S. patent application Ser. No. 10/710,995, which are incorporated herein by reference.

The movable bracket assembly 28 is an irregularly shaped body adapted to span the distance between the upper member 62 and the lower member 64, and to translate along the upper and lower members 62, 64. The bracket assembly 28 supports in a well known manner the reflective element assembly 12, and is fixedly attached to the housing 20. An example of such a bracket assembly is disclosed in U.S.

patent application Ser. No. 10/906,427, which is incorporated herein by reference. A connecting flange 52 extends laterally from a distal end of the bracket assembly 28 orthogonal to the longitudinal axis of the upper member 62, and is adapted for fixed attachment, such as by welding, an adhesive, a friction connection, and the like, to the distal end 83 of the translating member 82. The bracket assembly 28 is illustrated in FIG. 4 as also comprising a friction bearing assembly 50 adapted to develop friction between the bracket assembly 28 and the upper and lower members 62, 64 in order to control the movement of the bracket assembly 28. An example of the friction bearing assembly 50 is disclosed in U.S. patent application Ser. No. 10/906,427. Other bearing assemblies, including bearing assemblies disclosed in U.S. patent application Ser. No. 10/906,427, can also be utilized.

Figure 6:
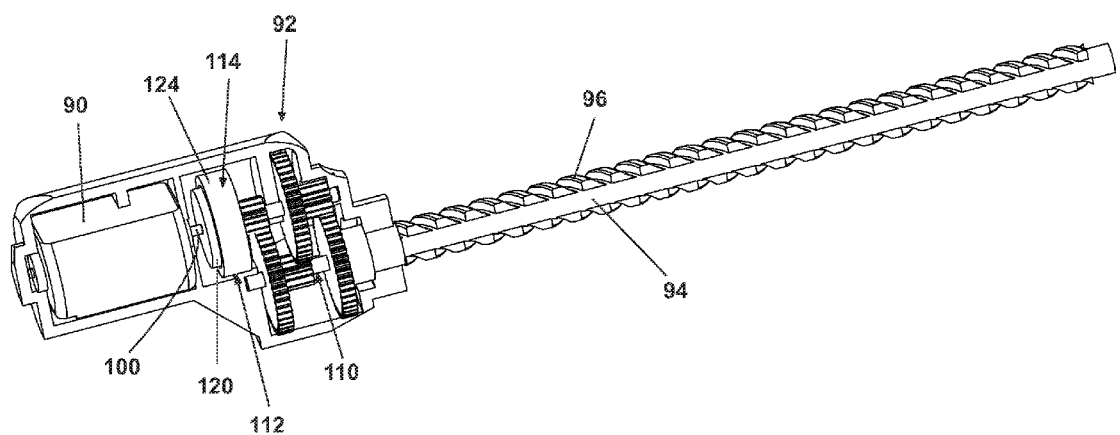
FIG. 6 is a cutaway view of the powerextend drive assembly of FIG. 5 illustrating a motor, a gear assembly, a slip clutch assembly, and a drive shaft.
Figure 7:
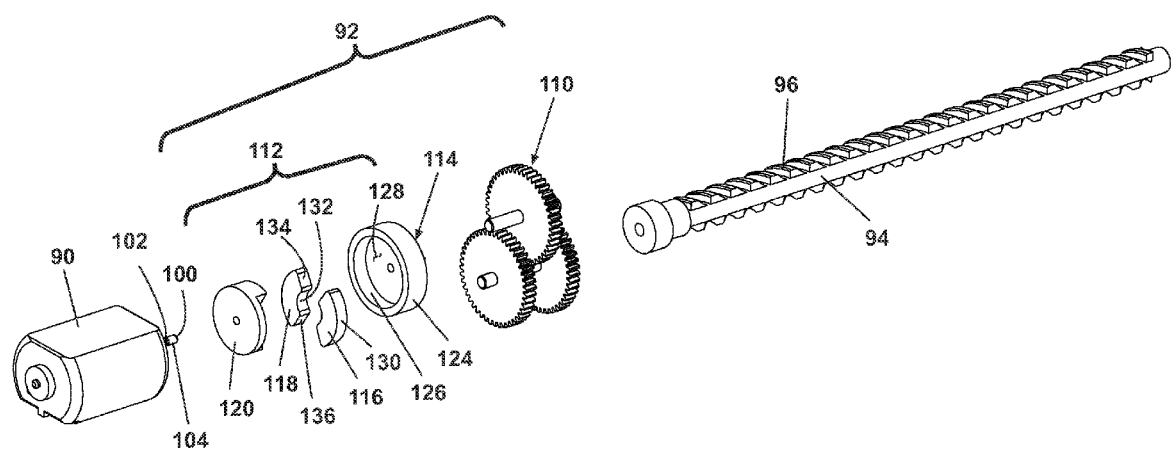
FIG. 7 is an exploded view of the powerextend drive assembly of FIG. 6 showing the gear assembly and the elements of the slip clutch assembly comprising a drum, a pair of centrifugal shoes, and a clutch plate.
Figure 8:
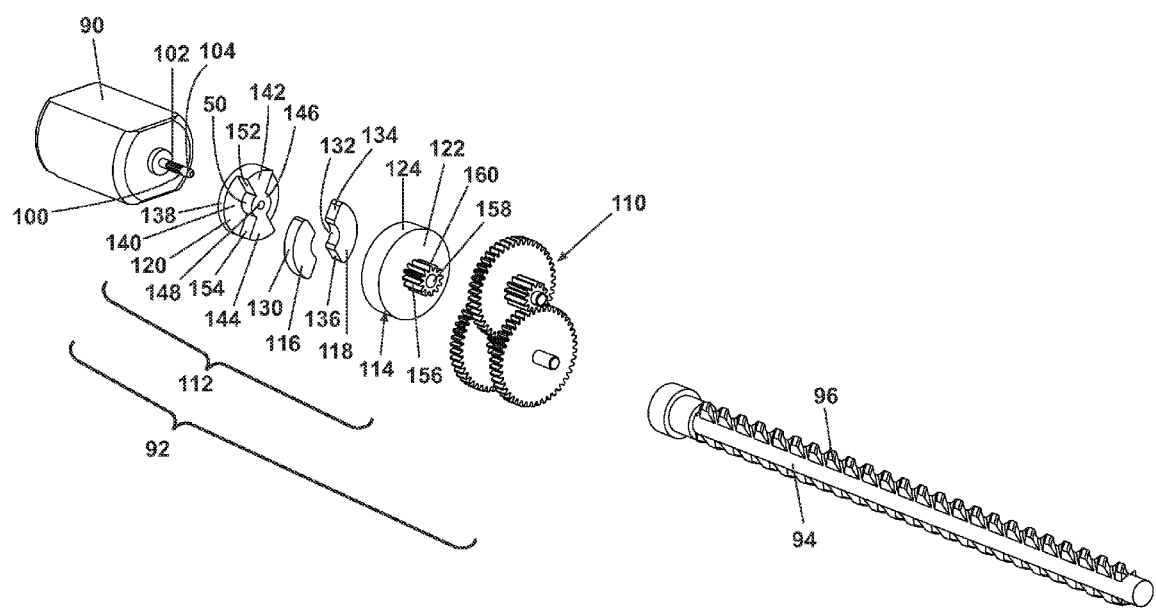
FIG. 8 is another exploded view of the powerextend drive assembly of FIG. 6, similar to FIG. 7 but from a different angle.

Referring also to FIGS. 6-8, the powerextend assembly 42 comprises a motor 90, a transmission 92, a drive shaft 94, and the nut follower 98. The motor 90 is a generally well-known, electrically powered motor suitable for the purposes described herein, preferably having a loaded speed of approximately 7000 rpm and capable of a velocity of 100 millimeters in somewhat less than 2 seconds. The motor 90 comprises a motor shaft 100 having a splined portion 102 along a central portion of the shaft 100, and a smooth portion 104 distally of the splined portion 102. The drive shaft 94 is generally well-known and provided with relatively shallow helical threads 96. The nut follower 98 is generally well-known and provided with internal threads adapted for cooperative registry with the drive shaft 94 for linear translation of the nut follower 98 along the drive shaft 94 with rotation of the drive shaft 94. The threads of both the drive shaft 94 and the nut follower 98 are adapted to provide 1" of travel per revolution of the drive shaft 94, and so that an externally-applied force to the nut follower 98 will urge the drive shaft 94 into rotation, enabling the nut follower 98 to translate along the drive shaft 94 in response to the application of the force. The structure and operation of the motor 90, transmission 92, drive shaft 94, and nut follower 98 are generally well-known.

The transmission 92 comprises a generally well-known gear assembly 110 and a clutch assembly 112 according to the invention. Preferably, the gear assembly 110 comprises 3 stages of spur gear meshes, each having a gear ratio of 44:12, i.e. 11:3, providing a total effective reduction gear ratio of 49.3:1. Thus, with the configuration of the drive shaft 94 described above, 49.3 motor revolutions will translate into 1" of travel of the nut follower 98 along the drive shaft 94. These ratios will enable the gear assembly 110 to rotate with a forced rotation of the drive shaft 94 independent of the operation of the motor 90, such as when the bracket assembly 28 and the nut follower 98 are manually translated along the drive shaft 94 during manual extension and retraction of the reflective element assembly 12 relative to the base assembly 14. Other gear ratios can be used, although the lowest practicable total gear ratio has been found to be 25:1 for a drive shaft providing a 1" travel per revolution.

The clutch assembly 112 comprises a circular drum 114, a pair of centrifugal shoes 116, 118, and a circular clutch plate 120. The drum 114 is a generally cylindrically-shaped body comprising an annular wall 124 extending orthogonally away from and along the circumference of a circular wall 122 to define a clutch chamber 128. The annular wall 124 has a circumferential surface 126 extending along the inner circumference thereof. Extending coaxially from the circular wall 122 away from the annular wall 124 is a cylindrical axis boss 156 having a circular aperture 158 therethrough, and provided with a plurality of teeth 160 adapted for cooperative registry with the gear assembly 110. The aperture 158 is adapted for slidable rotation about the smooth portion 104 of the motor shaft 100.

The clutch plate 120 is a generally circular, somewhat flattened body comprising a circular plate 138 having a distal surface 140. Extending away from the distal surface 140 is a somewhat hourglass-shaped extension 141 comprising a pair of diametrically-opposed, sector-shaped bosses 142, 144, and a cylindrical axis boss 146. The axis boss 146 is coaxial with the circular plate 138 and interconnects the bosses 142, 144 at their vertices. The arcuate outer surfaces of the bosses 142, 144 are coextensive with the circumference of the plate 138. A circular aperture 148 extends coaxially through the axis boss 146 and the circular plate 138, and is adapted for fixed registry with the splined portion 102 of the motor shaft 100 so that the clutch plate 120 will rotate with the rotation of the motor shaft 100.

Each sector-shaped boss 142, 144 comprises a pair of planar radial surfaces 152, 154 extending from the axis boss 146 to the arcuate outer surface of the sector-shaped boss 142, 144.

The centrifugal shoes 116, 118 are generally flattened, arc-shaped bodies comprising an outer arcuate bearing surface 130, an inner arcuate seating surface 132, and a pair of radial end surfaces 134, 136 connecting the bearing surface 130 and the seating surface 132. The centrifugal shoes 116, 118 have a thickness generally equal to the thickness of the extension 141 and are adapted to nest in a diametrically opposed configuration against the hourglass-shaped extension 141 so that the end surfaces 134 are in registry with the planar radial surface 152, the end surfaces 136 are in registry with the planar radial surface 154, and the seating surfaces 132 are in registry with the axis boss 146. As so configured, the bearing surfaces 130 will extend somewhat inwardly of and along the circumference of the circular plate 138.

The clutch assembly 112 is assembled by sliding the clutch plate 120 over the motor shaft 100 so that the aperture 148 is in fixed registry with the splined portion 102. The wall of the aperture 148 can be either splined to register with the splined portion 102 of the motor shaft 100, or adapted so that the splined portion 102 "bites" into the wall of the aperture 148 to fix the clutch plate 120 to the motor shaft 100. The centrifugal shoes 116, 118 are nested against the clutch plate 120, and the drum 114 is inserted over the centrifugal shoes 116, 118 and the clutch plate 120 with the smooth portion 104 of the motor shaft 100 inserted through the aperture 158. The clutch assembly 112 and the motor 90 are assembled with the gear assembly 110 and the drive shaft 94 to form the powerextend assembly 42.

Figure 9:
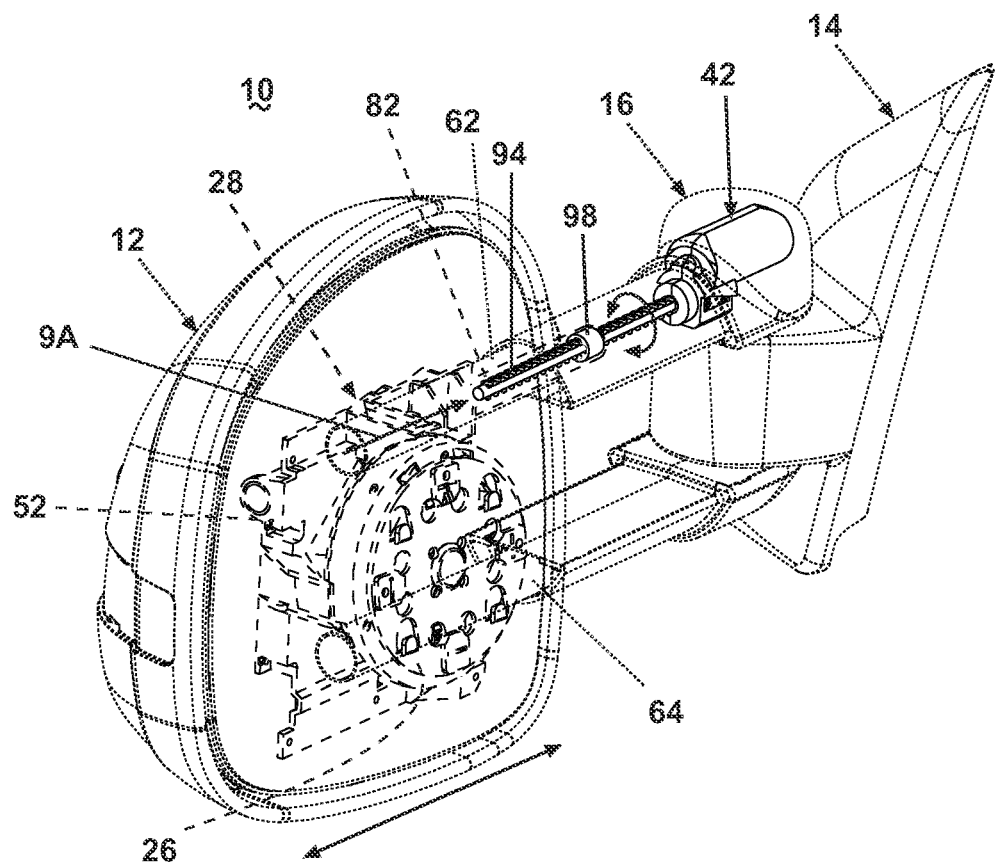
FIG. 9 is a perspective view of the powerextend mirror system of FIG. 1 illustrating the extension and retraction of the reflective element assembly by selective rotation of the drive shaft, with selected elements shown in phantom for clarity.
Figure 9A:
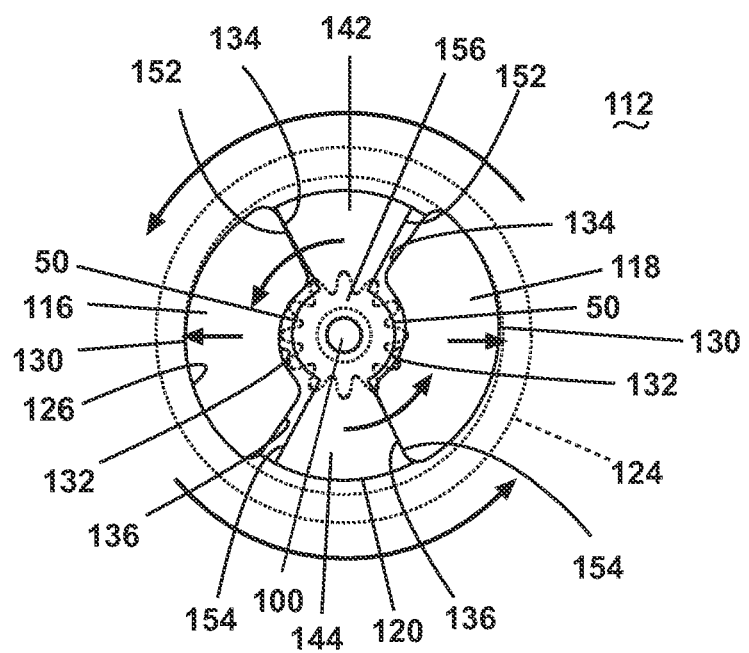
FIG. 9A is an enlarged axial view of the slip clutch assembly taken in the direction of line 9A of FIG. 9 illustrating the movement of the centrifugal shoes into engagement with the drum.

Referring now to FIGS. 9 and 9A, extension and retraction of the reflective element assembly 12 will be described. Activation of the motor 90 will cause the motor shaft 100 to rotate, thereby urging the clutch plate 120 to rotate. This rotation will urge the centrifugal shoes 116, 118 radially outwardly away from the axis boss 146 so that the bearing surfaces 130 will contact the circumferential surface 126 of the drum 114. Depending upon the direction of rotation of the clutch plate 120, the centrifugal shoes 116, 118 will also be translated so that the end surface 134 of a first one of the shoes will contact the radial surface 152 of a first one of the sector-shaped bosses, and the end surface 136 of a second one of the shoes will contact the radial surface 154 of a second one of the sector-shaped bosses. The centrifugal shoes 116, 118 will rotate about the motor shaft 100 with rotation of the clutch plate 120, while bearing against the circumferential surface 126 of the drum 114. Consequently, the drum 114 will rotate.

FIG. 9A illustrates the clutch assembly 112 rotating in a counterclockwise direction with the centrifugal shoes 116, 118 aligned in response to this rotation. It will be obvious that rotation in a counterclockwise direction will result in the centrifugal shoes 116, 118 being angularly translated for contact with the other of the sector-shaped bosses 142, 144. Rotation of the drum 114 will be transferred to the drive shaft 94 through the gear assembly 110. The drive shaft 94 will urge the translation of the nut follower 98 and the translating member 82. Movement of the translating member 82 will urge the movement of the movable bracket assembly 28 and the reflective element assembly 12.

Figure 10:
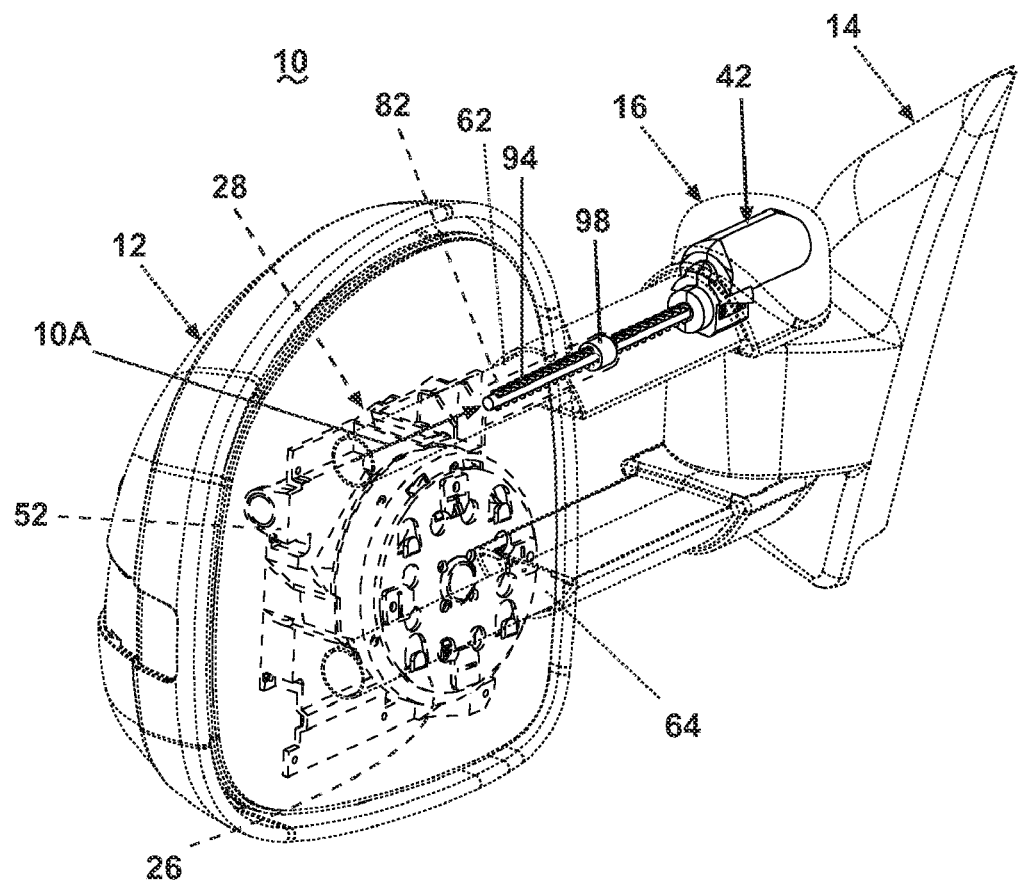
FIG. 10 is a perspective view of the powerextend mirror system of FIG. 1 illustrating the reflective element assembly in a stationary, preselected position with the motor deactivated, with selected elements shown in phantom for clarity.
Figure 10A:
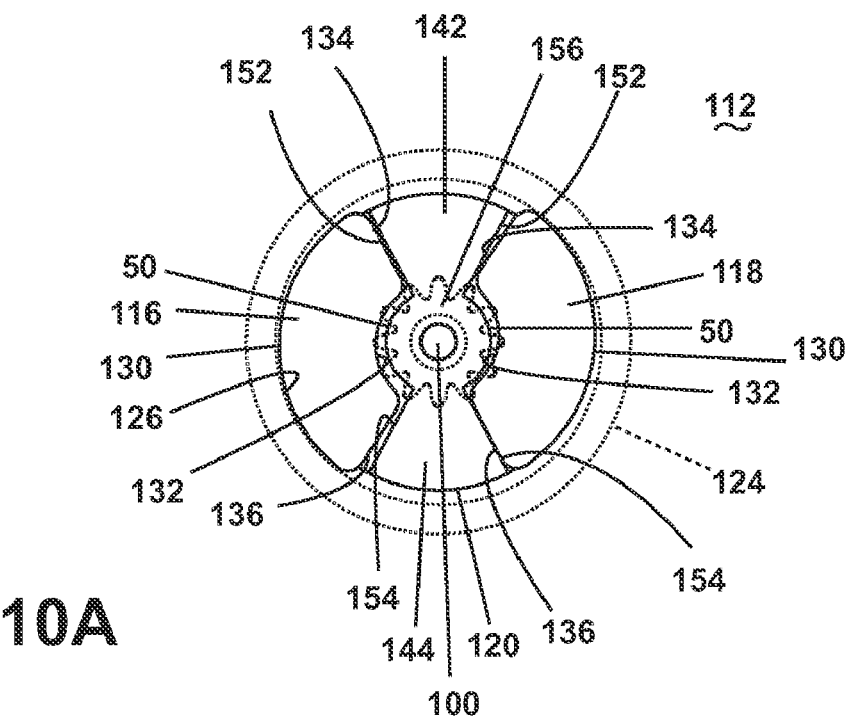
FIG. 10A is an enlarged axial view of the slip clutch assembly taken in the direction of line 10A of FIG. 10 illustrating the retraction of the centrifugal shoes away from engagement with the drum.

FIGS. 10 and 10A illustrate the mirror system 10 with the reflective element assembly 12 in a stationary position and the powerextend assembly 42 deactivated. In this configuration, the centrifugal shoes 116, 118 do not exert any force against the circumferential surface 126 of the drum 114. The drum 114 can rotate about the smooth portion 104 of the motor shaft 100 independently of the clutch plate 120 and the centrifugal shoes 116, 118.

Figure 11:
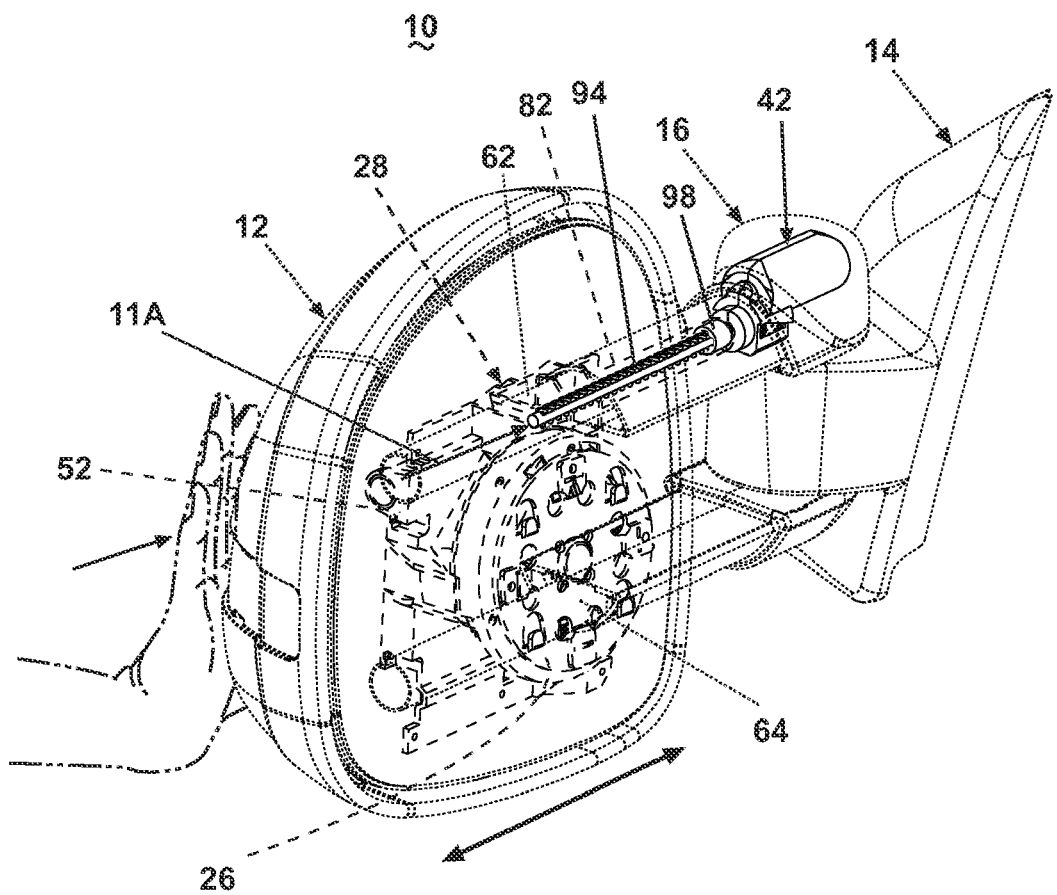
FIG. 11 is a perspective view of the powerextend mirror system of FIG. 1 illustrating the reflective element assembly being moved to a retracted position by a manually-applied force, with the motor deactivated, with selected elements shown in phantom for clarity.
Figure 11A:
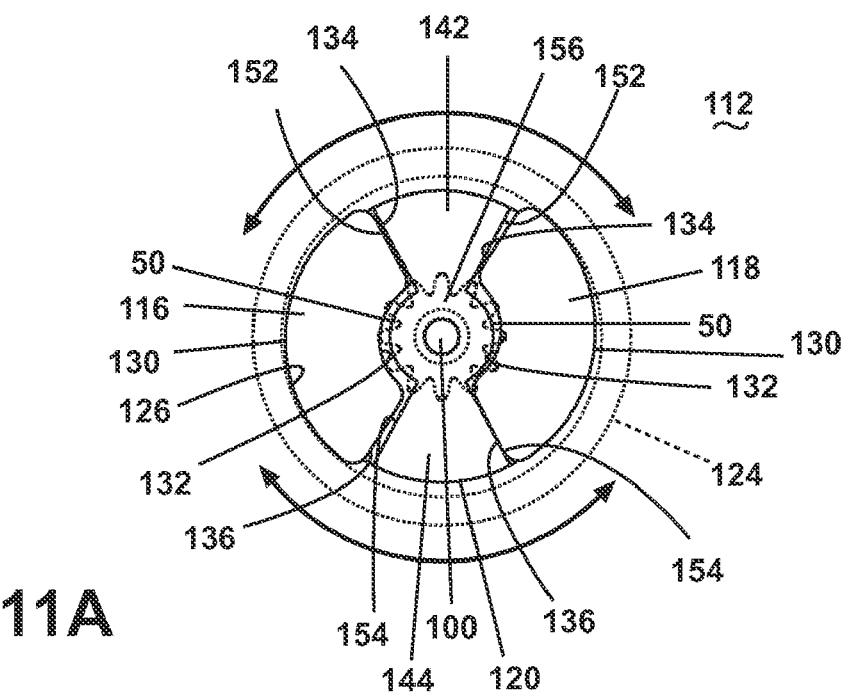
FIG. 11A is an enlarged axial view of the slip clutch assembly taken in the direction of line 11A of FIG. 11 illustrating the retraction of the centrifugal shoes away from engagement with the drum, which enables the drum to rotate independently of the clutch plate and centrifugal shoes.

FIGS. 11 and 11A illustrate the mirror system 10 with the reflective element assembly 12 being urged to a retracted position by manual application of a force to the reflective element assembly 12. The application of the force will urge the movable bracket assembly 28 and the translating member 82 toward the base assembly 14. The nut follower 98 will be urged toward the base assembly 14, thus urging the drive shaft 94 into rotation. The threads of the drive shaft 94 and the nut follower 98 are adapted to effect the rotation of the drive shaft 94 in response to the linear translation of the nut follower 98. The rotation of the drive shaft 94 will rotate the gear assembly 110 and the drum 124. The relative sizes, including the threads, of the gears comprising the gear assembly 110, and their interrelationship, are adapted so that rotation of the drive shaft will effect the rotation of the gears. Preferably, the gear assembly 110 is configured so that the torque developed in response to the action of the motor 90 will be comparable to the torque developed by the rotation of the drive shaft 94 in response to the translation of the nut follower 98. Finally, because the centrifugal shoes 116, 118 will not be urged against the circumferential surface 126 by rotation of the clutch plate 120, the drum 124 will rotate independently of the clutch plate 120 and the motor 90, thus minimizing the potential for damage to the motor 90, the transmission 92, the drive shaft 94, or the nut follower 98.

The slip clutch of the present invention effectively transfers power from a powerextend motor to a drive shaft for selective extension and retraction of the reflective element assembly relative to the vehicle. The slip clutch also enables the inadvertent or intentional manual extension and retraction of the reflective element assembly without damage to the elements comprising the powerextend assembly. The centrifugal shoe system comprises a minimum of complex parts, is simple and economical to fabricate and assemble, and is reliable. The slip clutch of the present invention is illustrated and described with respect to a specific powerextend assembly, but can find applicability in a variety of extendable mirror constructions, including mirror constructions such as are disclosed in U.S. Pat. Nos. 6,598,983; 6,582,087; 6,497,491; 6,439,730; 6,394,616; 6,390,635; 6,325,518; 6,276,808; 6,239,928; 6,213,609; 6,139,159; 6,116,743; 6,113,241; 5,969,890; 5,903,402; and 5,483,385, the entire disclosures of which are hereby incorporated by reference herein.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A vehicular mirror assembly, comprising:
   a base;
   a mirror housing having a reflective element therein, the mirror housing being coupled with the base for at least a normal path of movement between a retracted position where the mirror housing is adjacent the base and an extended position where the mirror housing is distal to the base;
   an actuator operatively mounted between the base and the mirror housing for selectively moving the mirror housing with respect to the base through the normal path of movement, the actuator comprising:
   a motor having a rotatable motor shaft;
   a gear assembly coupled with the motor shaft and rotatable with rotation of the motor shaft; and
   a rotatable drive shaft coupled with the gear assembly and the mirror housing for moving the mirror housing through the normal path of movement with rotation of the drive shaft;
   wherein the actuator comprises a clutch assembly so that the mirror housing can be moved between the extended and retracted positions by rotation of the drive shaft and the gear assembly independent of the rotation of the motor shaft; and
   wherein the clutch assembly is engaged to couple the rotation of the motor shaft with the rotation of the drive shaft when the motor is activated; and
   wherein clutch assembly is disengaged to operably isolate the motor shaft from the rotation of the drive shaft when the motor is deactivated.

2. A vehicular mirror assembly according to claim 1, wherein the gear assembly has an effective total gear ratio of at least 25:1.

3. A vehicular mirror assembly according to claim 2, wherein the gear assembly has an effective total gear ratio of 49.3:1.

4. A vehicular mirror assembly according to claim 1, wherein the clutch assembly is interposed between the motor and the gear assembly to enable rotation of the gear assembly independent of the rotation of the motor shaft.

5. A vehicular mirror assembly according to claim 1, wherein the drive shaft can move the mirror housing a distance of 1 inch with each revolution of the drive shaft.

6. A vehicular mirror assembly according to claim 1, wherein torque developed by the gear assembly resulting from the rotation of the motor shaft is equivalent to the torque developed by the gear assembly resulting from the rotation of the drive shaft.

7. A vehicular mirror assembly according to claim 1, wherein the clutch assembly is disengaged to operably isolate the motor shaft from the rotation of the drive shaft when the motor is activated and the movement of the mirror housing between the retracted position and the extended position is obstructed.

8. A vehicular mirror assembly according to claim 1, wherein the clutch assembly comprises a drum and at least one centrifugal shoe coupled with the motor, and the at least one centrifugal shoe is coupled with the drum when the motor is activated and is uncoupled from the drum when the motor is not activated.

* * * * *